United States Patent
Citron et al.

(10) Patent No.: US 7,592,413 B2
(45) Date of Patent: Sep. 22, 2009

(54) MANUFACTURE OF AROMATIC POLYESTER

(75) Inventors: Joel D. Citron, Wilmington, DE (US); David Neil Marks, Newark, DE (US); Marion G. Waggoner, Landenberg, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 147 days.

(21) Appl. No.: 11/517,848

(22) Filed: Sep. 8, 2006

(65) Prior Publication Data

US 2007/0066793 A1 Mar. 22, 2007

Related U.S. Application Data

(60) Provisional application No. 60/719,376, filed on Sep. 22, 2005.

(51) Int. Cl.
*C08G 63/00* (2006.01)

(52) U.S. Cl. ............... 528/308.3; 528/272; 528/308.6; 528/308.1; 528/271; 528/308

(58) Field of Classification Search ............... 528/271, 528/176, 272, 296, 302, 308, 308.6, 303, 528/304, 306, 308.1, 308.3; 442/59; 525/53, 525/315, 172, 173, 174, 176, 437, 439, 448; 425/130; 209/172.5, 3.1
See application file for complete search history.

(56) References Cited

U.S. PATENT DOCUMENTS

| | | | | |
|---|---|---|---|---|
| 3,498,950 A | * | 3/1970 | Zimmer, Jr. et al. | 528/176 |
| 3,522,214 A | * | 7/1970 | Crawford et al. | 526/65 |
| 4,296,232 A | * | 10/1981 | Maresca et al. | 528/179 |
| 4,319,017 A | * | 3/1982 | Kosanovich et al. | 528/176 |
| 4,619,979 A | * | 10/1986 | Kotnour et al. | 526/88 |
| 4,664,972 A | * | 5/1987 | Connolly | 442/59 |
| 4,714,747 A | * | 12/1987 | Bruzzone et al. | 526/64 |
| 5,969,089 A | * | 10/1999 | Narayan et al. | 528/357 |
| 6,444,782 B1 | | 9/2002 | Hamlin | |
| 6,469,078 B1 | * | 10/2002 | Simon et al. | 524/139 |
| 6,774,203 B1 | * | 8/2004 | Fukute | 528/176 |

FOREIGN PATENT DOCUMENTS

| | | | |
|---|---|---|---|
| DE | 19722232877 | * | 7/1972 |
| EP | 035 895 | | 9/1981 |
| EP | 0 964 014 A2 | | 12/1999 |

OTHER PUBLICATIONS

Masterton and Hurley, "Chemsitry: Principles and Reactions", 2006, ThomsonBooks/Cole, 5th edition, pp. 334-335.*
Kirk-Othmer Encyclopedia of Chemical Technology (4th Ed.) J. Kroschmitz, pp. 1007-1059, 1966.

* cited by examiner

*Primary Examiner*—Ling-Siu Choi
*Assistant Examiner*—Frances Tischler
(74) *Attorney, Agent, or Firm*—Loretta F. Smith; Arne Jarnholm

(57) ABSTRACT

Aromatic polyesters are made in a continuous process in an extruder or extruder-like apparatus by reacting at elevated temperatures dicarboxylic acids, aliphatic esters of aromatic diols, and optionally aliphatic esters of aromatic hydroxyacids in an extruder while removing byproduct aliphatic carboxylic acid. The resulting aromatic polyesters, especially thermotropic liquid crystalline aromatic polyesters, are useful as molding resins for a variety of uses, for example electronic and electrical parts.

9 Claims, No Drawings

US 7,592,413 B2

MANUFACTURE OF AROMATIC POLYESTER

CROSS REFERENCE TO RELATED APPLICATIONS

This application claims the benefit of priority to U.S. Provisional Application No. 60/719,376, filed Sep. 22, 2005.

FIELD OF THE INVENTION

Aromatic polyesters are made in a continuous process in an extruder or extruder-like apparatus by reacting at elevated temperatures dicarboxylic acids, aliphatic esters of aromatic diols, and optionally aliphatic esters of aromatic hydroxyacids while removing byproduct aliphatic carboxylic acid.

TECHNICAL BACKGROUND

Aromatic polyesters, such as "polyarylates" and certain liquid crystalline polymers (LCPs) are important items of commerce. They are typically made by one of two processes. In one of the processes the aromatic carboxyl groups are converted to aryl esters (e.g. esters of phenol), and then reacted with the aromatic hydroxy compounds to form the polyesters and byproduct aromatic hydroxyl compound (e.g. phenol) which is removed by volatilization. More commonly used is the route that involves reaction of the aromatic carboxyl groups with aliphatic esters (e.g. acetates) of the aromatic hydroxyl groups with subsequent removal of the byproduct aliphatic acid (e.g. acetic acid).

Typically the aliphatic carboxylic (di)ester starting material is prepared by reaction of an aliphatic carboxylic anhydride (e.g. acetic anhydride) with the hydroxyl groups, and then that ester is reacted with the aromatic carboxyl groups to start the polymerization process. The equations for such reactions are given below:

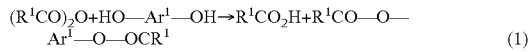

(1)

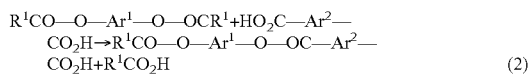

(2)

If an aromatic hydroxyacid is present it reacts with the anhydride as follows:

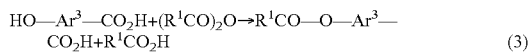

(3)

In these equations $R^1$ is alkyl, substituted alkyl, cycloalkyl, or substituted cycloalkyl, and $Ar^1$, $Ar^2$ and $Ar^3$ are each independently arylene or substituted arylene. The aliphatic ester groups and aromatic carboxyl groups in the product of Equation (3) may then react analogously to those in reaction (2). Reaction (2), which is the condensation reaction, then repeats many times to form the polyester. Notice that in all of the steps the aliphatic carboxylic acid (ACA), $R^1CO_2H$, is a byproduct.

In the process using the aliphatic carboxylic (di)ester the aliphatic carboxylate esters may be formed beforehand and isolated, and then reacted with the aromatic carboxylic acid groups in a "separate" reaction, or they may be formed "in situ" in the presence of the aromatic carboxyl compounds. During the polymerization process, as the condensation of the monomers proceeds to form higher and higher molecular weight oligomers and then polymers, the reaction temperature is typically raised and the byproduct ACA is distilled off. Towards the end of the polymerization process vacuum may be used to remove the byproduct acid, and/or the lower molecular weight polymer or oligomer may be solidified and "solid state polymerized". These various combinations of steps typically require significant amounts of time which can range up to 12-24 hours to complete. Depending on the particular process steps chosen a relatively complex series of reaction vessels may be required. Exposure of the polymer to high temperatures for long periods of time may also cause some degradation.

Therefore simpler, faster and less expensive polymerization processes for aromatic polyesters are desired.

The molecular weight of polyesters made using other types of chemical intermediates have been increased in an extruder, see for instance M. H. Mack, NPE'88, Vol. 2 Conference Papers, p. 131 et seq. (1988), and M. H. Mack et al., Annual Technical Conference Society of Plastics Engineers 1987, p. 136-139(1987). Besides the chemistry of the polymerization reactions being different, in these papers the polyesters are not made in the extruder from the monomers.

SUMMARY OF THE INVENTION

This invention concerns a process for the production of an aromatic polyester, comprising, contacting, in an extruder at elevated temperature one of the following:
  (a) one or more diesters of aliphatic carboxylic acids and dihydroxyaromatic compounds, and one or more aromatic dicarboxylic acids; or
  (b) one or more diesters of aliphatic carboxylic acids and dihydroxyaromatic compounds, one or more aromatic dicarboxylic acids, and one or more esters of aliphatic carboxylic acids and aromatic hydroxyacids; or
  (c) one or more esters of aliphatic carboxylic acids and aromatic hydroxyacids;
provided that during said contacting aliphatic carboxylic acid byproduct is removed from said extruder.

DETAILS OF THE INVENTION

Herein certain terms are used and are defined below:

By an aromatic hydroxyl group is meant a hydroxyl group bound directly to the carbon atom of an aromatic ring.

By a dihydroxyaromatic compound is meant a compound having two aromatic hydroxyl groups. The aromatic hydroxyl groups may be on the same or different aromatic rings, and the aromatic ring(s) may be fused (as in naphthalene), connected by a covalent bond (as in biphenyl), or connected by another connecting group (as in bisphenol-A, and diphenyl ether).

By an aromatic carboxyl group is meant a carboxyl group bound directly to the carbon atom of an aromatic ring.

By an aromatic dicarboxylic acid is a compound having two aromatic carboxyl groups. The carboxyl groups may be on the same or different aromatic rings, and the aromatic ring(s) may be fused (as in naphthalene), connected by a covalent bond (as in biphenyl), or connected by another connecting group (as in bisphenol-A, and diphenyl ether).

By an aromatic hydroxyacid is meant a compound having one aromatic hydroxyl group and one aromatic carboxyl group. The carboxyl and hydroxyl groups may be on the same or different aromatic rings, and the aromatic ring(s) may be fused (as in naphthalene), connected by a covalent bond (as in biphenyl), or connected by another connecting group (as in bisphenol-A, and diphenyl ether).

By an alkyl carboxylic acid is meant a compound of the formula $R^4CO_2H$ wherein $R^4$ is alkyl, substituted alkyl, cycloalkyl or substituted cycloalkyl. Preferably $R^4$ is alkyl, more preferably alkyl containing 1 to 6 carbon atoms, and especially preferably methyl.

By alkyl is meant the usual meaning, a univalent radical containing only carbon or hydrogen. By substituted alkyl is meant the alkyl group may contain one or more substituents such as aryl, halo, ether, keto, etc. Preferably the alkyl or substituted alkyl group contains 1 to 30 carbon atoms.

By cycloalkyl is meant a univalent group in which the free valence is to a saturated carbon atom (no multiple bonds to the carbon atom) of a carbocyclic or heterocyclic ring. By substituted cycloalkyl is meant the cycloalkyl group may contain one or more substituents such as alkyl, aryl, halo, ether, keto, etc. Preferably the cycloalkyl or substituted cycloalkyl group contains 1 to 30 carbon atoms.

In general herein substituents (especially functional groups) should not interfere with the reactions to form the aromatic polyester, nor cause the resulting polyester to degrade (for example thermally) during the polymerization process.

By an aromatic polyester herein is meant a polymer in which at least 70 mole percent, preferably at least 80 mole percent, more preferably at least 90 mole percent, and especially preferably all of the connecting groups (groups which link repeat units together) in the polymer are aromatic ester groups. The polyester may contain other groups such as esters which are not aromatic ester groups, and groups, etc. Preferably all the connecting groups are ester groups.

By an aromatic ester group is meant an ester formed by an aromatic carboxyl group and an aromatic hydroxyl group.

By an extruder is meant an apparatus that is similar in function to a typical single or twin screw extruder used, for instance, for melt processing thermoplastics or for processing foods. The extruders useful herein typically have some or all of the following characteristics:

It acts as a modified plug flow reactor (sometimes also called a tubular reactor). Plug flow reactors are well known in the art, see for instance J. I. Kroschwitz, et al., Ed., *Kirk-Othmer Encyclopedia of Chemical Technology*, 4th Ed., Vol. 20, John Wiley & Sons, New York, 1996, p. 1007-1059, which is incorporated by reference herein. In a plug flow reactor the ingredients enter a tube or pipe at one end and flow to the other end with little or no backmixing, while for instance a reaction is taking place. The time needed to flow from one end to the other is the residence time. The present extruders are usually "modified" plug flow reactors because they often do have some localized backmixing within the length of the extruder.

It has one or more vents along the length of the extruder to remove volatile byproducts formed during the polymerization reaction. These vents may be at any pressure, but typically are at atmospheric pressure or below.

Different sections along the length of the extruder may be heated to different temperatures.

It has a high surface to volume ratio, the surfaces in this case being the outer vessel (in an extruder usually called the barrel) and the surface area of the agitators (in a typical extruder the screws or kneaders).

It is capable of rapidly generating new surface or changing the surface of the liquid ingredient(s). By this is meant the ingredients in actual contact with the surfaces of the extruder (barrel and screw) are constantly changing.

It has enough power and structural strength to push through the ingredients to the discharge end, in this case the polyester formed.

It melts at least some of starting ingredients and/or some of the starting ingredients are molten, and usually maintained in the melt. Also the oligomer and polymer formed are in the melt until exiting the extruder, unless it is desired to freeze (solidify) the oligomer or polymer before exiting the extruder (for example to form a particulate of the polymer or oligomer). Thus for the most part a melt polymerization is taking place.

Usually the agitator elements, such as the screws or kneaders, rotate in a circular motion.

Usually the cross section of the vessel (barrel) perpendicular to the long axis of the extruder is circular (as in a single screw extruder) or overlapping circles (as in a twin screw extruder).

Examples of extruders (as used herein) include single and twin screw extruders, such as those supplied by Davis-Standard, LLC, Pawcatuck, Conn. 06379 USA, under various tradenames including Sterling®, and Coperion USA, Ramsey, N.J. 07446, USA supplied under the tradename Werner-Pfleiderer®, and Davis-Standard LLC, and kneaders such as those supplied by Coperion USA under the tradename Buss®.

As mentioned herein the screw configuration of the extruder may be used to (in part) control the process, such as the molecular weight of the product produced and/or the time required for the process. Such variables are discussed in M. H. Mack, NPE'88, Vol. 2 Conference Papers, p. 131 et seq. (1988), and M. H. Mack et al., Annual Technical Conference Society of Plastics Engineers 1987, p. 136-139(1987).

If the aliphatic carboxylic ester (ACE) and/or diester (ACDE) are preformed they may be added directly to the rear (herein the "rear" of the apparatus is the end where the ingredients are fed) by feeders which measure the amounts of each of ingredients added. If the ingredients are solids they may be added using so-called weight loss feeders, for example feeders made by K-Tron International, Inc., Pitman, N.J. 08071 USA, and Acrison Inc., Moonachie, N.J. 07074 USA. The solids may be added to a funnel-like device (which may have a vibrator attached to ensure no plugs) into the extruder throat. The extruder will then move the ingredients towards the exit or discharge end. The ingredients will be heated and at least partially melted and the condensation reaction [equation (2) above] will begin. Towards the rear of the extruder the temperatures will typically be hot enough to boil out much of the byproduct ACA formed, so vents for removing the byproduct need only be at atmospheric pressure. As the ingredients travel towards the discharge end typically the temperature being maintained in those portions of the extruder will increase, but the ease of removal of the smaller amounts of ACA being formed decreases. Therefore towards the discharge end typically the vapor ports for removal of the ACA may be under vacuum.

The temperatures of the various zones in the extruder will normally be maintained having certain factors in mind. Towards the rear, when the ingredients are still low in molecular weight, indeed even monomeric, the temperature should preferably not be so high that the low molecular weight materials significantly vaporize (if this does happen an excess amount of this ingredient may be added). Also if the byproduct ACA is coming off rapidly the temperature should not be so high that the ingredients foam into the vapor removal ports. Towards the discharge end the temperature should be high enough so that the ingredients are maintained in a melt (or slurry). Typically this will be above the melting point of the polymer being produced, and also high enough so that the polymerization to that the desired molecular weight is reached by the time the product is discharged. However the temperature should not be so high that significant decomposition of the polymeric product occurs.

All other factors being equal the longer the residence usually the higher the molecular weight the polymer produced is.

Residence time is affected by the length of the extruder (longer is longer residence time), the pitch of the conveying elements (shorter pitch is longer), the speed (rpm) of the conveyor (higher rpm is shorter), and the presence of items such as reverse elements or kneading blocks (usually longer).

Other factors may also affect the molecular weight of the aromatic polyester produced. On vapor ports which are vacuum, higher vacuum (lower pressure) will usually increase molecular weight. Higher effective surface (of the ingredients) to volume ratios, and/or the rate at which new surface is produced will normally increase molecular weight. The presence of a catalyst for the condensation reaction may also increase the molecular weight, especially if the condensation reaction rate is not controlled by the rate of diffusion of removal of the ACA. However in one preferred form, such a (polymerization) catalyst is not deliberately added to the process. A gas sweep may also be used to increase molecular weight, that is gas is introduced into the extruder space and removed through a (usually nearby) vent. Typically this gas is inert, such as nitrogen.

As mentioned above the ACE and/or ACDE may be formed and isolated before being added to the extruder. Another preferred method of carrying out the process is to form the ACE and/or ACDE by mixing the appropriate amount of the hydroxyl containing monomer(s) with an approximately equimolar amount of the aliphatic carboxylic anhydride (actually often a small excess of the anhydride is used), and allowing the anhydride to react with the hydroxyl groups. During this time the aromatic dicarboxylic acids, if needed, may also be present or may be added after the reaction. The resulting mixture (assuming the dicarboxylic acids were present) contains ACA byproduct, the compounds containing the esterified hydroxyl groups, and the dicarboxylic acids. Often at the temperature of the reaction (and partially because the reaction is exothermic) one will have a solution of the esterified compounds in acetic acid, with the dicarboxylic acids, which are typically powders, forming a slurry in this solution.

Alternatively the esterification, preferably in the presence of the aromatic dicarboxylic acids (or the acids may be added later in a "downstream" step) may be carried out in the extruder. The byproduct ACA (from the esterification, the byproduct ACA from the condensation reaction also must still be removed) may be removed by volatilization through the vapor removal ports. Since an additional reaction is taking place in the extruder, the extruder may need to be lengthened and/or other steps take to increase the residence time of the ingredients in the extruder in order to complete the polymerization to the desired molecular weight.

Another factor in consideration of where the esterification is done is the amount of ACA which must be removed. Enough heat must be furnished to the extruder contents to vaporize all of the ACA formed, both in the esterification (if done in the extruder or before the extruder and the ACA not removed) and the polymerization stages. While some heat may be furnished by the exothermic reaction of the carboxylic anhydride with the hydroxyl groups, additional heat needs to be furnished by the extruder, at least in the early states, by heating the extruder barrels. Since the extruder has relatively small static surface area, and much heat energy may be needed, the barrel of the extrude may have to be quite long to remove all of the ACA. Therefore it may be preferable to preform the ACE(s) and/or ACDE(s), and remove most or all of the byproduct ACA before entering the extruder.

Alternatively the esterification reaction may be carried out in a separate vessel which may be a batch, semibatch or continuous reactor. The liquid or slurry (if dicarboxylic acids are already present, or they can be added to the extruder as a separate solid feed) may then be added to the extruder. However, byproduct ACA may be removed from the mixture before being put into the extruder. For example some of it may be distilled from the process mixture while the mixture remains in the vessel in which the esterification is carried out. Or the liquid or slurry may be passed through a continuous still, for example a thin film still, to remove some of the byproduct ACA. The amount of ACA removed however should not be so large that the process mixture freezes to a relatively immobile solid at the process temperature. Removal of some of the byproduct ACA before addition to the extruder lowers the amount of ACA vapor that must be removed through the vapor removal ports of the extruder. It may also allow use of a shorter residence time in the extruder, which is advantageous (for instance higher throughput and/or a shorter extruder).

Other materials which are normally found in polyester compositions may also be present during the process. These may be added with the ingredients or downstream in the extruder. However these other ingredients should not interfere substantially with the polymerization process. These other materials may be added in conventional (for polyester compositions) amounts. These materials include reinforcing agents, fillers, pigments, antioxidants and other stabilizers, lubricants, crystallization nucleators such as plasticizers, and flame retardants. Specific useful materials which usually do not interfere with the polymerization include carbon black, $TiO_2$, glass fiber, glass flake, milled glass fiber, carbon fiber, polyethylene wax (in minimal amounts as a lubricant), clay, talc, and wollastonite.

The aromatic polyester produced may be isotropic such as a so-called typical polyarylate, usually a copolymer of terephthalic acid, 2,2-bis(4-hydroxyphenyl)propane (also called bisphenol-A), and optionally isophthalic acid. However a preferred aromatic polyester is a thermotropic liquid crystalline polymer (LCP). By an LCP is meant is meant a polymer which is anisotropic when tested by the TOT test as described (or a functionally similar test) in U.S. Pat. No. 4,118,372, which is hereby included by reference. By thermotropic is meant the LCP may be melted and is anisotropic in the melt, as described in the TOT test.

Useful dicarboxylic acid monomers for LCPs include terephthalic acid, isophthalic acid, 2,6-napthalenedicarboxylic acid, and 4,4'-bibenzoic acid. Useful aromatic diol monomers for LCPs include hydroquinone, 4,4'-biphenol, 2,6-dihydroxynaphthalene, 2-t-butylhydroqunone, 2-methylhydroquinone, 2-phenylhydroquinone, resorcinol, and hydroquinone, 4,4'-biphenol and t-butylhydroquinone are preferred, and hydroquinone and 4,4'-biphenol are especially preferred. Useful aromatic hydroxyacid monomers for LCPs include 6-hydroxy-2-napthoic acid, 4-hydroxybenzoic acid (PHBA), 3-hydroxybenzoic acid, and 6-hydroxy-2-napthoic acid and PHBA are preferred and PHBA is especially preferred.

As described above the process makes higher molecular weight polymers from monomers. Preferably the weight average molecular weight of the aromatic polyester produced is about 2,000 or more, more preferably about 5,000 or more, especially preferably about 10,000 or more, and very preferably 15,000 or more. However lower molecular weight aromatic polyesters (made from monomers by the process described above) may be converted to higher molecular weight aromatic polyesters by feeding them into an extruder (molten or melting them in the extruder) and treating them as described above. Preferably the weight average molecular weight is increased by at least 20%, more preferably by at least 50%. These molecular weights may be determined by size exclusion chromatography by dissolving the aromatic polyester in an appropriate solvent.

Preferably the process to produce the aromatic polyester of a desired molecular weight takes (has a residence time of) less than 20 minutes, more preferably less than 10 minutes, especially preferably less than 5 minutes, and very preferably less than 2 minutes. This is particularly true when producing the aromatic polyester from monomers.

In another preferred form the polyester produced, especially an LCP, has a melt viscosity of 1 Pa·s or more, more preferably 10 Pa·s or more, highly preferably 30 Pa·s or more, very preferably 50 Pa·s or more, and especially preferably 100 Pa·s or more, when measured at a shear rate of 1000/sec. These melt viscosities are determined using a Kayness Model 8052 viscometer, Kayness Corp., Morgantown Pa., U.S.A., at a temperature of 20-50° C. above the melting point of the polyester being tested.

It is to be understood that any of the above preferred polyester product properties may be combined with any other property or any other process parameter(s) such a residence time to form a preferred process.

In any aromatic polyester made (and indeed for any polyester), if a dicarboxylic acid is used an approximately molar equivalent of diol will also be used. This is simply a well known requirement of the polymerization chemistry. However in some instances when the diol is particularly volatile an excess of that diol may be used to make up for any diol lost by volatilization. Aromatic diols and dicarboxylic acids are not required, and aromatic hydroxyacids may be used alone, for instance a mixture of PHBA and 6-hydroxy-2-napthoic acid may form a thermotropic LCP.

In the Examples the following abbreviations are used:
BP—4,4'-biphenol
HQ—hydroquinone
I—isophthalic acid
KPHBA—potassium salt of PHBA
Mn—number average molecular weight
Mw—weight average molecular weight
N—2,6-naphthalenedicarboxylic acid
PHBA—4-hydroxybenzoic acid
T—terephthalic acid Melting points and glass transition points were measured by Differential Scanning Calorimeter (DSC) at a heating rate of 25° C./min, using ASTM Method D3418. Melting points were taken as the peak of the melting endotherm on the second heating, while glass transition points were taken as the midpoint of the measured transition.

Molecular weights were measured by Size Exclusion Chromatography using hexafluoroisopropanol as a solvent, and a poly(ethylene terephthalate) standard.

EXAMPLES 1 AND 2

These examples illustrate the preparation of an LCP having the nominal molar composition HQ/BPI/MN/PHBA, 50/50/87.5/12.5/320. For Example 1 a mixture of 8.08 g BP diacetate, 5.81 g HQ diacetate, 8.70 g T, 1.62 g N, 34.48 g PHBA acetate, 0.0036 g KPHBA and 10 g of the LCP polymer of this composition prepared in the melt but not in an extruder, was made up. For Example 2 a mixture of 10.10 g BP diacetate, 7.26 g HQ diacetate, 10.88 g T, 2.02 g N, 43.11 g PHBA acetate, and 0.0045 g KPHBA was made up.

The polymerization was run in a Prism® Model TSE-16-TC twin screw extruder (Prism Engineering, Staffordshire, W5B 6PW, England) which had a nominal L:D of 25:1. From the rear of the extruder, the feed section was about 4.6 cm long, the first mixing section was about 17.5 cm long, a kneading section was about 5.1 cm long, the next mixing section was about 5.6 cm long, the next kneading section was about 4.1 cm long, and the final screw section was about 7.4 cm long. The product was discharged into an aluminum pan. The approximate free internal volume of the extruder was about 10 mL. Downstream of the first mixing section equipped with kneading elements, the process was vented via two atmospheric pressure vent ports to a cold trap to capture any volatiles from the process. The extruder feed throat was blanketed with nitrogen gas and a local exhaust evacuated the nitrogen from the area. The extruder discharge was into an enclosure blanketed with nitrogen gas and equipped with local exhaust ventilation. The product exiting the extruder was dropped into water in a pan to freeze the polyester. Extruder conditions are listed in Table 1.

Example 1 was started by slowly adding the well mixed mixture into the feed throat of the extruder. Initially, a cloudy vapor was observed exiting the extruder at the die, followed by a light brown material and some cloudy (white) vapor. After the mixture of Example 1 had been run through the extruder and isolated, Example 2 was started.

For Example 2, a new collection pan was used and the second mixture (no polymer) was added to the extruder. Vapor was observed to be vented through the vent ports in the middle of the extruder. More appeared to be venting from the vent closer to the feed end. Acetic acid was smelled at the feed throat. There was some coating of the solid starting material by condensation of this vapor at the feed throat. Also, gas was observed bubbling out through the product at the end of the extruder. The product color was a lighter shade of brown than the product of Example 1. The product was collected over 10-20 minutes.

TABLE 1

|  | Example 1 | Example 2 |
| --- | --- | --- |
| Temperatures, ° C. |  |  |
| feed throat | 176 | 174 |
| zone 2 | 252 | 251 |
| zone 3 | 329 | 329 |
| zone 4 | 350 | 350 |
| die | 359 | 360 |
| residence time, min:sec | 1:03 | 1:08 |
| pressure at die, kPa | 620 | 620 |
| torque | 12 | 12 |
| screw rpm | 100 | 101 |

The LCP of Example 1 had a melting point of 337.5° C. and the melting point of the LCP of Example 2 was 346.1° C. A typical melting point of this polymer prepared by "normal" melt polymerization (not in an extruder) is about 345-350° C. The LCP of Example 2 had an Mn of 14,430 and an Mw of 24,780.

EXAMPLES 3-4

For Example 3 a mixture of 34.28 g BP diacetate, 18.98 g T, 2.11 g I, 34.28 g PHBA acetate (molar ratio 100/90/10/150) and 0.0045 g KPHBA was made up. For Example 4 a mixture of 81.3 g BP diacetate, 30.0 g T, 20.0 g I, 157.2 g PHBA acetate (molar ratio 100/60/40290), and 0.023 g KPHBA was made up.

The polymerization was run in the same extruder as described in Examples 1-2. Extruder conditions are listed in Table 2.

TABLE 2

|  | Example 3 | Example 4 |
|---|---|---|
| Temperatures, °C. | | |
| feed throat | 190 | 180 |
| zone 2 | 280 | 350 |
| zone 3 | 370 | 350 |
| zone 4 | 390 | 350 |
| die | 400 | 350 |
| screw rpm | 100 | 100 |

For Example 4 a different aluminum pan was used to collect the product.

The product of Example 3 had a melting point of 372.5° C. by DSC. A typical melting point of this polymer prepared by "normal" melt polymerization (not in an extruder) is about 400° C. The melting point of the LCP of Example 4 was 266.1° C. A typical melting point of this polymer prepared by "normal" melt polymerization (not in an extruder) is about 330° C.

What is claimed is:

1. A process for the production of an aromatic polyester, comprising, contacting, in an extruder at elevated temperature one of the following:
   (a) one or more diesters of aliphatic carboxylic acids and dihydroxyaromatic compounds, and one or more aromatic dicarboxylic acids; or
   (b) one or more diesters of aliphatic carboxylic acids and dihydroxyaromatic compounds, one or more aromatic dicarboxylic acids, and one or more esters of aliphatic carboxylic acids and aromatic hydroxyacids; or
   (c) one or more esters of aliphatic carboxylic acids and aromatic hydroxyacids;
   wherein said esters and/or diesters are preformed before entering said extruder;
   provided that during said contacting aliphatic carboxylic acid byproduct is removed from said extruder and a residence time in said extruder is less than 20 minutes.

2. The process as recited in claim 1 wherein said aromatic polyester all connecting groups are aromatic ester groups.

3. The process as recited in claim 1 wherein said extruder is a single screw extruder, a twin screw extruder, or a kneader.

4. The process as recited in claim 1 wherein said aliphatic carboxylic acid of steps a-c or the aliphatic carboxylic acid byproduct is acetic acid.

5. The process as recited in claims 1 wherein said polyester is a thermotropic liquid crystalline polymer.

6. The process as recited in claim 5 wherein a diester of an aromatic hydroxyacid is present.

7. The process as recited in claim 6 wherein said aromatic hydroxyacid is 4-hydroxybenzoic acid.

8. The process as recited in claim 1 wherein said aromatic polyester has a weight average molecular weight of about 5000 or more.

9. The process as recited in claim 1 which has a residence time of about 10 minutes or less.

* * * * *